United States Patent [19]

Shea et al.

[11] Patent Number: 5,152,155
[45] Date of Patent: Oct. 6, 1992

[54] CARBON DIOXIDE REFRIGERATING SYSTEM

[76] Inventors: Ronald D. Shea, 14010 Vantine Rd., SE., Tenino, Wash. 98589; Michael G. Batchelor, 4139 Boston Hrb. Rd. NE., Olympia, Wash. 98506

[21] Appl. No.: 505,059

[22] Filed: Apr. 5, 1990

[51] Int. Cl.$^5$ .............................................. F25D 3/12
[52] U.S. Cl. ............................................. 62/385; 62/388; 62/407
[58] Field of Search ............... 62/407, 385, 388, 239; 105/355, 463.1

[56] References Cited

U.S. PATENT DOCUMENTS

| | | | |
|---|---|---|---|
| 1,975,177 | 10/1934 | Sherrick | 62/383 |
| 2,325,371 | 7/1943 | Clerc | 62/131 |
| 2,731,807 | 1/1956 | Allyne | 62/89 |
| 3,206,946 | 9/1965 | Lindersmith et al. | 62/407 |
| 3,561,226 | 2/1971 | Rubin | 62/388 |
| 3,783,633 | 1/1974 | Glynn et al. | 62/168 |
| 3,971,231 | 7/1976 | Derry | 62/388 |
| 4,248,060 | 2/1981 | Franklin, Jr. | 62/387 |
| 4,299,429 | 11/1981 | Franklin, Jr. | 62/384 |
| 4,376,511 | 3/1983 | Franklin, Jr. | 239/14.2 |
| 4,376,511 | 3/1983 | Franklin, Jr. | 239/14.2 |
| 4,381,649 | 5/1983 | Franklin | 62/388 |
| 4,404,818 | 9/1983 | Franklin, Jr. | 62/388 |
| 4,457,142 | 7/1984 | Bucher | 62/388 |
| 4,502,293 | 3/1985 | Franklin, Jr. | 62/388 |
| 4,593,536 | 6/1986 | Fink et al. | 62/388 |
| 4,704,876 | 11/1987 | Hill | 62/388 |
| 4,761,969 | 8/1988 | Moe | 62/388 |
| 4,766,732 | 8/1988 | Rubin | 62/388 |
| 4,891,954 | 1/1990 | Thomsen | 62/388 |

Primary Examiner—Albert J. Makay
Assistant Examiner—John Sollecito
Attorney, Agent, or Firm—Brian J. Coyne

[57] ABSTRACT

An apparatus for cooling refrigeration containers using pressurized liquid carbon dioxide is disclosed. The container has upper and lower compartments with a longitudinal distribution pipe located in the upper compartment which extends substantially the length of the container. The pressurized, liquid carbon dioxide is distributed through the distribution pipe in the upper compartment through a plurality of apertures located in the longitudinal distribution pipe which causes an accumulation of carbon dioxide snow in the upper compartment. The refrigerated gas cools the sidewalls of the lower compartment by passing through serpentine passages contained within those sidewalls. There are also switchable cooling vents which, when opened, allow refrigerated gas to pass from the upper compartment directly into the lower comparment. If the material to be refrigerated is intolerant of a carbon dioxide environment and cannot be frozen, the switchable cooling vents can be closed and the refrigerated gas will only pass through the sidewalls. An exhaust means is disclosed which maintains a certain pressure within the container thereby allowing the container to be refrigerated for a longer period of time from a single charge of pressurized, liquid carbon dioxide.

13 Claims, 6 Drawing Sheets

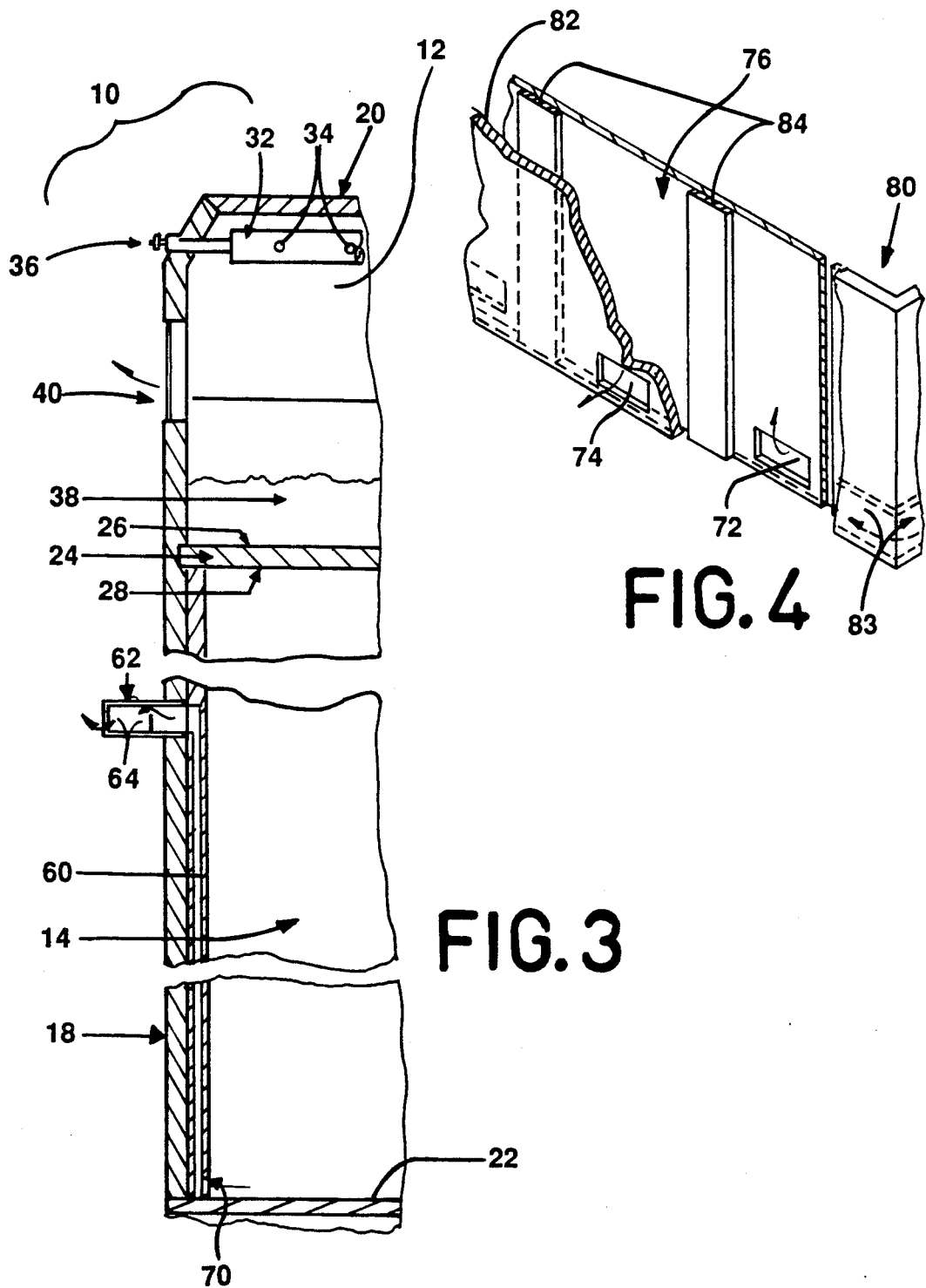

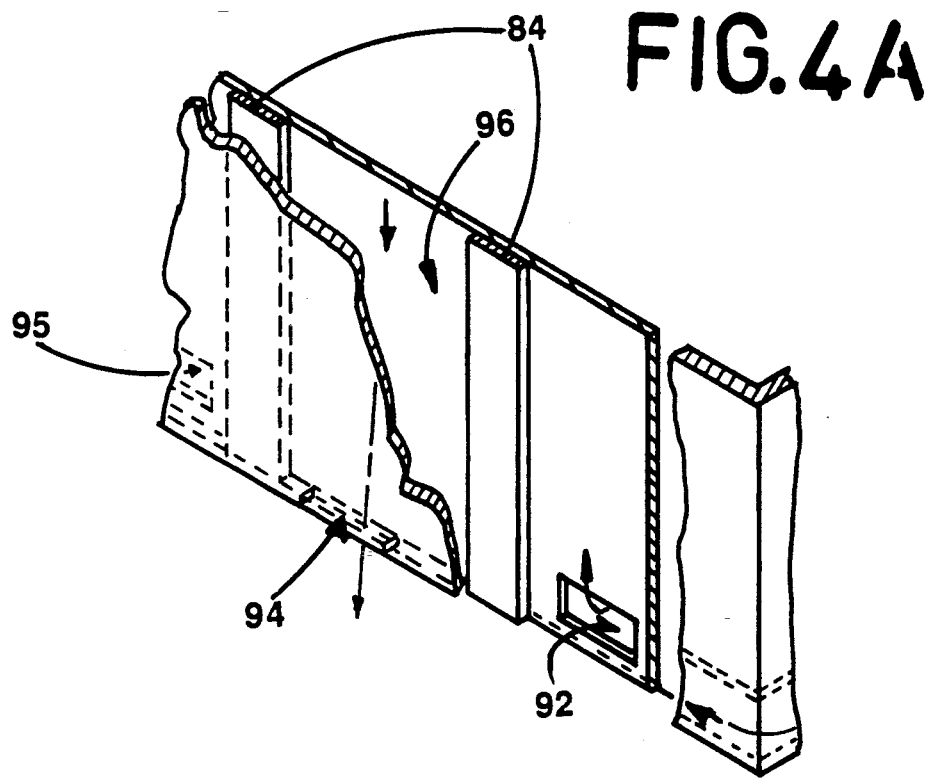

CARBON DIOXIDE REFRIGERATING SYSTEM

TECHNICAL FIELD

The present invention relates to carbon dioxide refrigerating systems. More particularly, the present invention relates to a carbon dioxide refrigerating system for a container such as a railcar, truck trailer, or marine shipping container, to refrigerate perishable goods while transporting them, said system using a carbon dioxide distribution system, a switchable cooling means for the sidewalls of the container, and an exhaust means to vent to excess gas within the container.

BACKGROUND OF THE INVENTION

Refrigeration systems for preserving perishable materials while those materials are being transported have been used for some time. Different types of refrigeration systems, such as freon-based compressor systems and carbon dioxide systems, have been used over the years.

Carbon dioxide refrigeration systems have been gaining increased use in recent years due to several advantages inherent in such systems. In carbon dioxide refrigeration systems, pressurized liquid carbon dioxide is introduced into pipes which constitute a carbon dioxide distribution system within the refrigeration container. The pipes have a plurality of apertures. When the pressurized liquid carbon dioxide passes through the pipes and apertures, the carbon dioxide pressure drops rapidly, and the carbon dioxide converts to solid carbon dioxide "snow" and carbon dioxide gas.

Typically, the refrigeration container has a compartment that holds the perishable materials to be refrigerated. The distribution pipes are arranged to deposit the "snow" on the ceiling of the lower compartment, as shown in Hill (U.S. Pat. No. 4,704,876). The "snow" refrigerates the lower compartment during the transportation of the perishable materials. As shown in Franklin (U.S. Pat. No. 4,502,293), fans may also be used to increase the circulation of refrigerated air around the lower compartment. Some systems, such as Hill, vent the refrigerated gas into the compartment to increase the refrigerating affect. As the container gradually warms up, the carbon dioxide "snow" sublimates to gas and, together with the gas already present in the container, this gas expands as the temperature in the container rises. Vents to the outside atmosphere are provided to allow the excess carbon dioxide gas to escape from the container.

It can be seen from the above discussion that the carbon dioxide refrigeration systems are very simple mechanically. Unlike freon-based compressor systems, the carbon dioxide refrigeration systems have almost no moving parts to repair or maintain. Also, liquid carbon dioxide is inexpensive, and readily available. With the insulation typically used in a refrigeration container, such as a railcar or a truck trailer, a single carbon dioxide charging of a refrigeration container will allow frozen foods to remain stored for a week or more without operator intervention.

Despite the advantages of a carbon dioxide refrigeration system as represented by the invention disclosed in Hill, there remain a number of problems with such systems. The carbon dioxide distribution system in these systems is inefficient for several reasons. Typical distribution systems only produce about one pound of "snow" for every two pounds of liquid carbon dioxide. Also, when cooling vents to the lower compartment are on the surface to which the snow is applied, there can be a problem with vents to the lower compartment accidentally being plugged by the "snow", thus preventing the refrigerated gas from entering the lower compartment.

Inefficiencies also occur when the excess carbon dioxide gas is vented from the refrigeration container. When the exhaust vent is located low in the container, as it is in Hill, the excess carbon dioxide gas readily escapes the refrigeration container, thus, lowering the pressure within the container. This lower pressure, in turn, increases the rate of sublimation of the "snow" into gas and shortens the length of time that the container will remain refrigerated.

Different problems are represented by perishable materials, such as fresh produce, that cannot be frozen and some of which are intolerant of a high carbon dioxide environment. For such materials, the refrigeration temperature must be limited in the lower compartment, and carbon dioxide gas must be kept out of the lower compartment. These restrictions can prevent the use of refrigeration containers designed only to store and transport frozen materials for the transporting of materials like fresh produce.

As can be seen from the present discussion, it would be desirable to have a carbon dioxide refrigeration system that would allow the use of one refrigeration container for the refrigeration of either frozen materials or materials that cannot be frozen and which may be intolerant of a carbon dioxide environment.

It would also be desirable to have a carbon dioxide refrigeration system that would more efficiently create "snow" in the refrigeration container and distribute refrigerated air. Further, it would be desirable to have a system that would remain sufficiently refrigerated for a longer period of time than is possible with existing systems.

Although the discussion herein relates to carbon dioxide refrigeration systems for transportation containers, it is not intended that the invention be limited to this situation. It will be obvious from the description that follows that the present invention will be useful in other applications with problems common to those described herein.

SUMMARY OF THE INVENTION

It is the object of the present invention to provide a carbon dioxide refrigeration system that will allow one refrigeration container to be used for the refrigeration and transportation of either frozen materials or materials that cannot be frozen and are intolerant of a carbon dioxide environment.

It is also the object of the present invention to provide a carbon dioxide refrigeration system that will produce higher density "snow" than is possible with existing refrigeration systems.

It is the further object of the present invention to provide a carbon dioxide refrigeration system that will remain sufficiently refrigerated for longer periods of time than is possible with existing refrigeration systems.

It is another object of the present invention to provide a carbon dioxide refrigeration system that will be mechanically simple and easy to repair.

The present invention achieves these objectives and other objectives which will become apparent from the description that follows, with a container having upper and lower compartments. The pressurized, liquid carbon dioxide is distributed through a longitudinal distribution pipe which extends substantially the length of the container and is located in the upper compartment. The distribution pipe has a plurality of apertures which are directed substantially to the sides of the upper compartment. There is a means to cool the sidewalls of the lower compartment which allows the refrigeration of materials that cannot be frozen as well as frozen materials. There is also a means for exhausting the excess carbon dioxide gas from the refrigeration container.

The cooling means for the container sidewalls includes a plurality of switchable cooling vents which allow the refrigerated gas to pass from the upper compartment to the lower compartment. The refrigerated gas passes from the upper compartment through cooling vent passages located above the distribution pipe in proximity to the container roof, and through cooling vents, which are located in the horizontal partition which serves as the upper compartment floor and lower compartment ceiling, into the lower compartment.

If the cooling vents are open to the lower compartment, the refrigerated gas passes down the sidewalls of the lower compartment, guided in part by channels formed by a plurality of raised surfaces on the container sidewalls. If the material to be refrigerated cannot be frozen and is intolerant of a carbon dioxide environment, the cooling vents are closed and the refrigerated gas passes through serpentine passages located in the sidewalls of the lower compartment.

The exhaust means consists of a vent box located on one of the endwalls of the container and a vent box passage located within the same endwall connecting the vent box with the lower compartment and the serpentine passages in the sidewalls of the lower compartment. The vent box is located at approximately three-quarters of the height of the lower compartment and contains at least two flap valves. Gas passing through the serpentine passages of the sidewalls empty into a lower longitudinal duct that extends substantially the length of each sidewall. These ducts are, in turn, connected to the passage leading to the vent box. Gas from the lower compartment passes through floor ducts in the floor of the compartment to a lower exhaust vent which allows the gas to pass from the lower compartment to the passage leading to the vent box. When the gas pressure is sufficient to open the flap valves, the gas is exhausted into the atmosphere.

In an alternative embodiment, the exhaust means consists of two lower internal exhaust vents, one lower external exhaust vent, and an exhaust vent passage which connects the lower internal exhaust vents with the lower external exhaust vent. The lower internal exhaust vents are located at approximately the height of the container floor. The lower external exhaust vent, which discharges the exhaust gas to the atmosphere, can be located at approximately the height of the container floor. In some applications such as shipping containers, it is preferable to have the external exhaust vent in the container floor and discharge the exhaust gas through the container floor. Within the exhaust vent passage, there are vertical barrier means between each of the lower internal exhaust vents and the lower external exhaust vent.

As gas from the lower compartment passes through floor ducts to the lower internal exhaust vents which allows the gas to pass from the lower compartment into the exhaust vent passage. Due to the vertical barrier means, gas cannot escape from the lower compartment until the gas pressure within the lower compartment is sufficient to allow gas to rise above and pass over the vertical barrier means and be exhausted into the atmosphere and through the lower external exhaust vent. Similarly, the vertical barrier means prevent gas from exiting the upper compartment through the lower longitudinal duct until the gas pressure in the upper compartment increases.

In another alternative embodiment, there are a plurality of circulation ducts which are located within the link of the horizontal partition that serves as the upper compartment floor and lower compartment ceiling. Each of the circulation ducts extends substantially the length of this partition. At one end of each of these ducts there is a circulating means, usually a fan, which circulates gas the length of the ducts. When the fans are turned on, gas passes through the circulating means and down the length of the duct. As the gas travels along the duct, it is refrigerated by the carbon dioxide "snow" which sits on the upper compartment floor immediately atop the circulating ducts. The gas then passes out a plurality of apertures opening downward into the lower compartment.

Other alternative embodiments envision the carbon dioxide refrigeration system being used in a railroad car, a truck trailer, and a marine shipping container of the type used on cargo ships. A further embodiment utilizes the carbon dioxide refrigeration system in a container for transportation of only fresh produce.

BRIEF DESCRIPTION OF THE DRAWINGS

FIG. 3 is an enlarged, partial, cross-section view of a preferred embodiment in accordance with the present invention of FIG. 1, generally taken along line 3—3.

FIG. 4 is a partial, cut away perspective view of an alternative preferred embodiment in accordance with the present invention.

FIG. 4A is a partial, cut away perspective view of an alternative preferred embodiment in accordance with the present invention.

DETAILED DESCRIPTION OF PREFERRED EMBODIMENTS

Figure 1:
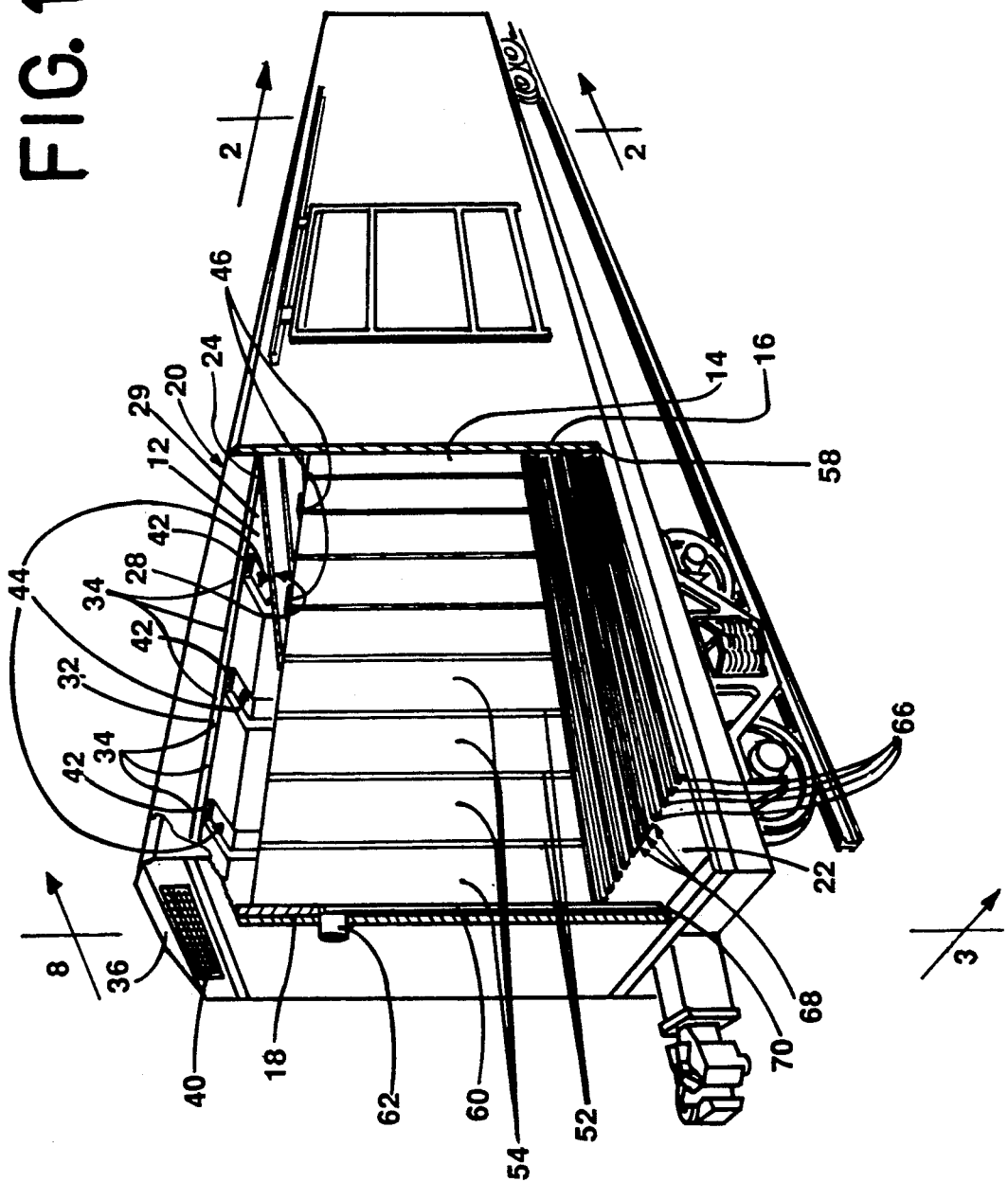
FIG. 1 is a perspective view of a preferred embodiment in accordance with the present invention.

A preferred embodiment in accordance with the present invention as shown in FIG. 1. In this embodiment, a railcar 10 serves as the refrigeration container. The container is divided into an upper compartment 12 and a lower compartment 14. The container has two opposed sidewalls 16, first and second opposed endwalls 18 and 18a, a roof 20, and a floor 22. The container's sidewalls, endwalls, floor and roof are all insulated.

The upper and lower compartments are formed, in part, by a substantially horizontal partition 24, which forms the upper compartment floor 26, and the lower compartment ceiling 28. The lower compartment is further defined by the sidewalls, endwalls and floor of the container. The upper compartment is further defined by the container sidewalls, container roof, and the container endwalls. The construction of the upper and lower compartments are also shown in detail in FIG. 2.

Figure 2:
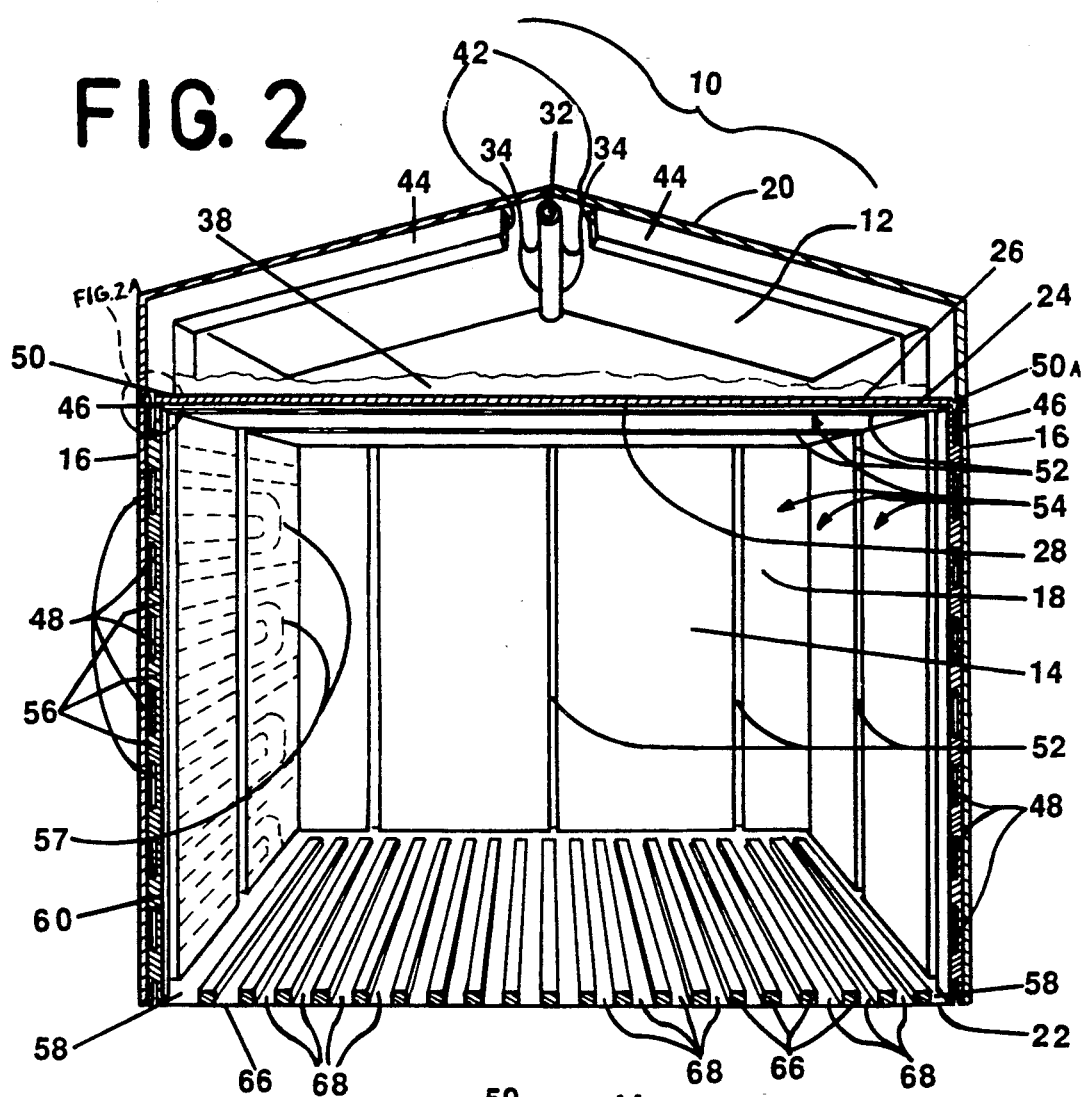
FIG. 2 is an enlarged, cross-sectional view of a preferred embodiment in accordance with the present invention of FIG. 1 taken generally along line 2—2.

The carbon dioxide distribution system is located in the upper compartment as shown in FIGS. 1 and 2. The carbon dioxide distribution system consists of a longitudinal distribution pipe 32 extending substantially the length of the container. The distribution pipe has a plurality of apertures 34 through its surface, which are directed substantially toward the container sidewalls.

The carbon dioxide distribution system is filled or charged with pressurized, liquid carbon dioxide (not shown) through an input or charging system 36, which is well known in the art. When the pressurized, liquid carbon dioxide is put through the input valve, the carbon dioxide passes through the longitudinal distribution pipe. The pressure drops rapidly as the carbon dioxide passes through the apertures and transforms from a liquid into carbon dioxide gas and carbon dioxide "snow" 38. The "snow" is distributed across the upper compartment floor, as shown in FIG. 2.

While the carbon dioxide system used in the present invention is relatively efficient, generating approximately one pound of snow for every two pounds of carbon dioxide, a large volume of carbon dioxide gas is still generated very quickly during the charging process. The interior of the refrigeration container can be damaged if a means of rapidly venting the excess gas is not provided. The upper compartment exhaust vent means 40 allows the rapid venting of the excess gas that is generated during charging of the carbon dioxide distribution system. At all other times, the upper compartment exhaust vent means is closed so that no gas can pass through it.

Figure 2A:
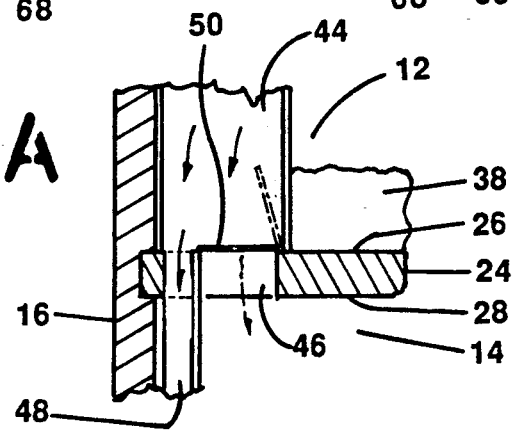
FIG. 2a is an enlarged, partial cross-sectional view of a preferred embodiment in accordance with the present invention of FIG. 2.

As shown in FIGS. 2 and 2a, after the carbon dioxide distribution system has been charged and the "snow" has been generated, refrigerated gas can pass into the upper openings 42 of the cooling vent passages 44 and down through the cooling vent passages to a plurality of openings which form the cooling vents 46. As shown in FIGS. 2 and 2a, these cooling vents allow communication between the upper compartment and both the lower compartment and a plurality of serpentine passages 48, at least one of which is located in each of the two container sidewalls.

As shown in FIG. 2, each cooling vent has a switchable valve means which controls the direction of the flow of refrigerated gas from the upper compartment. When switchable valve means 50 are open, refrigerated gas may flow through the cooling vents and down the sidewalls of the lower compartment. The flow of the refrigerated gas is generally directed by a plurality of channels 52 formed by a plurality of raised surfaces 54 on the container sidewalls, endwalls, and lower compartment ceiling. These channels and raised surfaces are also used in the lower compartment on the endwalls and ceiling to ensure continued circulation of refrigerated air in the lower compartment when it is tightly packed for shipping. The presence of the refrigerated gas in the lower compartment decreases the refrigeration temperature for frozen foods.

When materials are being transported, such as fresh produce, which cannot be frozen and may be intolerant of a carbon dioxide environment, switchable valve means 50a is closed. When the switchable valve means is closed, refrigerated gas cannot pass through the cooling vents into the lower compartment. Rather, as shown in FIG. 2, the gas passes through the cooling vents into the serpentine passages 48 located within the container sidewall. These passages have a plurality of substantially horizontal sections 56, which are connected by downwardly curving sections 57, and which allow the refrigerated gas to substantially cool both sidewalls. With the switchable valve means in the closed position, the lower compartment continues to be refrigerated, but at a more moderate temperature, and the refrigerated gas is kept out of the lower compartment, thereby greatly reducing the concentration of carbon dioxide to which the refrigerated materials are exposed. Gas can also pass behind the sidewalls when the switchable valve means is open.

After the refrigerated gas has passed through the serpentine passages, the gas passes into one of two lower longitudinal ducts 58, as illustrated in FIG. 2. One lower longitudinal duct extending substantially the length of each container sidewall. The refrigerated gas passes through the lower longitudinal ducts toward the second endwall 18a of the container until the lower longitudinal duct empties into the vent box passage 60. As shown in FIG. 3, the vent box passage is contained within the second endwall of the container. The vent box passage allows the gas to pass from both lower longitudinal ducts to the vent box 62, which is located on the outside of the second endwall, at approximately three-quarters of the height of the lower compartment. The vent box allows communication between the interior of the container and the atmosphere. The vent box contains at least two flap valves 64.

As the temperature in the container rises, carbon dioxide gas sublimates from the carbon dioxide "snow". Gradually, the gas pressure in the upper compartment, serpentine passages, and lower longitudinal ducts increases until the gas pressure is sufficient to allow the excess refrigerated gas to pass through the flap valves.

When refrigerated gas passes through the cooling vents into the lower compartment, as discussed above, they pass down the channels in the lower compartment sidewalls to the floor. As shown in FIG. 1, subflooring means 66 in the lower compartment creates a plurality of floor ducts 68 which extend substantially the length of the lower compartment floor. When the refrigerated gas reaches the subflooring means, it enters these floor ducts and passes towards the second endwall. Near the floor on the second endwall there is a lower exhaust vent 70 which allows the refrigerated gas contained within the lower compartment to pass into the vent box passage, as shown in FIG. 3. Just as with refrigerated gas passing from the upper compartment, through the serpentine passages in the sidewalls and the lower longitudinal ducts, when the refrigerated gas pressure in the lower compartment has increased sufficiently, the refrigerated gas will force the flap valves contained within the vent box open and exhaust gas to the atmosphere.

An alternative embodiment in accordance with the present invention is shown in FIG. 4, which is an alternative means for exhausting gas from the refrigeration container. This exhaust means consists of two lower internal exhaust vents 72, a lower external exhaust vent 74, and an exhaust vent passage 76. Each of the lower exhaust vents is located at approximately the same height as the container floor. The lower internal exhaust vents allow the passage of gas from the lower compartment 80 to the exhaust vent passage which is located within an endwall 82 of the container. The lower external exhaust vent allows gas to pass from the exhaust vent passage into the atmosphere. Similarly, gas from the lower longitudinal ducts 83 cannot pass into the atmosphere until the gas pressure increases.

Located within the exhaust vent passage there are two vertical barrier means 84, one vertical barrier means on either side of the lower external exhaust vent between it and each of the lower internal exhaust vents. The vertical barrier means prevents the passage of gas from the lower internal exhaust vents to the lower external exhaust vent, until the gas pressure within the lower compartment increases sufficiently to raise gas up and over the vertical barrier means within the exhaust vent passage. The gas can then descend to the lower external exhaust vent and into the atmosphere. Thus, the height of the vertical barrier means directly affects the pressure levels of the exhaust gas within the lower compartment.

Figure 6:
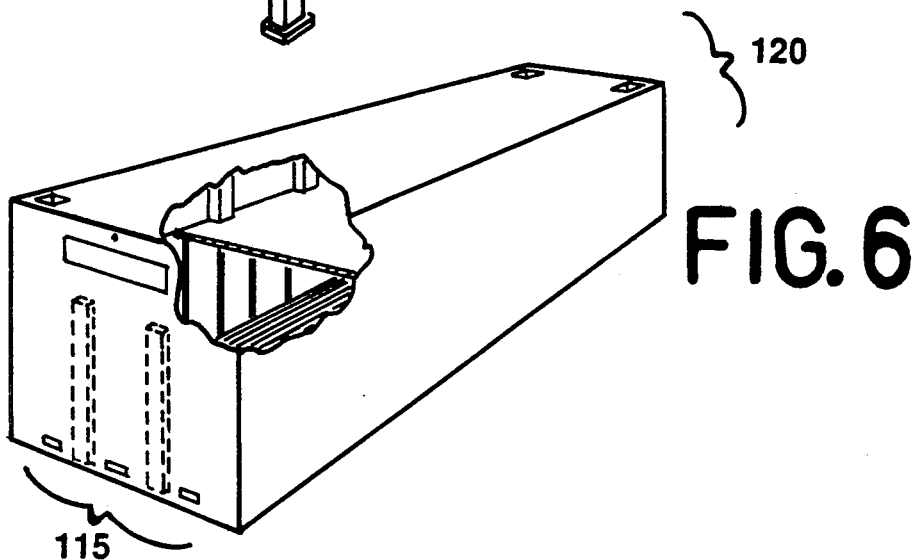
FIG. 6 is a perspective view of a further alternative preferred embodiment in accordance with the present invention.

This alternative embodiment of the exhaust means is designed specifically to deal with environments where there is a potential problem with water entering the refrigeration container from the outside, such as marine shipping containers 120 aboard a cargo ship, as illustrated in FIG. 6. With exhaust means as disclosed in the first embodiment above, if water is introduced into the vent box, it can readily drop through the vent box passage and into the lower longitudinal ducts and the lower compartment.

With this embodiment of the exhaust means, water must enter the lower external exhaust vent with sufficient force to allow the water to rise above the vertical barrier means before it can pass into the lower compartment, and the lower longitudinal ducts. At the same time, as with the exhaust means in the first embodiment, the gas pressure in the upper and lower compartments is increased, thus decreasing the rate of sublimation and lengthening the amount of time that the materials within the lower compartment remain refrigerated.

An additional alternative embodiment which provides an alternative means for discharging exhaust gas from a refrigeration container is shown in FIG. 4a. This alternative embodiment is virtually identical to the embodiment illustrated in FIG. 4 in most important aspects. The alternative embodiment shown in FIG. 4a has two lower internal exhaust vents 72', an external exhaust vent 74', an exhaust vent passage 76', and two vertical barrier means 84'. The chief difference between this embodiment and the other alternative embodiment is that the external exhaust vent 74' is located in the container floor, and thus, the exhaust gas discharges to the atmosphere through the container floor as opposed to the end of the container. This alternative embodiment is also designed specifically for use with refrigeration containers, such as marine shipping containers 120, as illustrated in FIG. 6.

Figure 7:
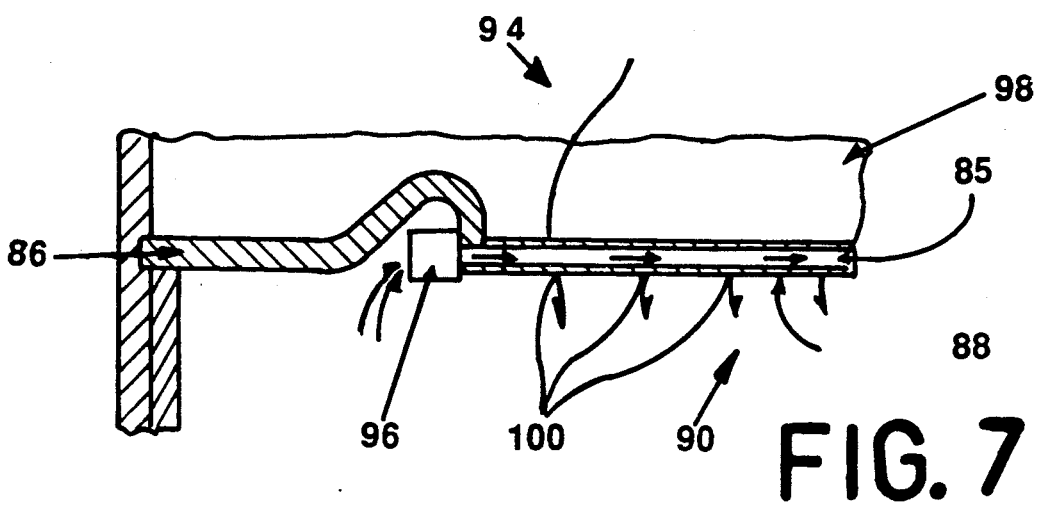
FIG. 7 is a partial, side cross-sectional view of yet another alternative preferred embodiment in accordance with the present invention.

Another alternative embodiment is illustrated in FIG. 7, which is a system for circulating refrigerated gas in the lower compartment to increase the cooling of materials stored there. This system consists of a plurality of circulation ducts 85 located within and extending substantially the length of horizontal partition 86. As with the other embodiments in accordance with the present invention, the horizontal partition constitutes the ceiling 88 of the lower compartment 90, and the floor 92 of the upper compartment 94. Located within each of the circulation ducts, usually near one end of the duct, there is a circulation means 96, normally a fan. When the circulation means is turned on, gas passes along the length of the circulation duct and becomes refrigerated due to the "snow" 98 sitting on the upper compartment floor which is immediately atop the circulation duct. There are a plurality of apertures 100 along the circulation duct opening downward into the lower compartment, and as the circulation means pushes the refrigerated gas along the length of the circulation duct the refrigerated gas passes through these apertures into the lower compartment, further cooling it.

Figure 5:
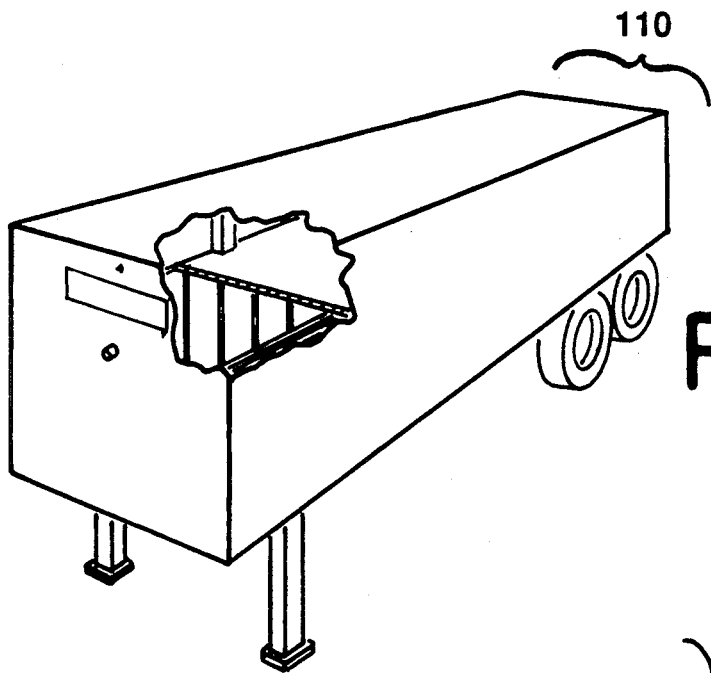
FIG. 5 is a perspective view of another alternative preferred embodiment in accordance with the present invention.

An additional alternative embodiment is shown in FIG. 5, which is the substantially identical carbon dioxide cooling system of the first preferred embodiment placed within a truck trailer 110. The carbon dioxide refrigeration system itself functions identically in both preferred embodiments.

A further alternative embodiment is shown in FIG. 6, which is a substantially identical carbon dioxide cooling system of the first preferred embodiment, using the exhaust means 115 of the second preferred embodiment placed within a marine shipping container 120 of the type used on cargo ships. The refrigeration system itself, other than the alternative embodiment of the exhaust means discussed above, functions identically to the first preferred embodiment.

Figure 8:
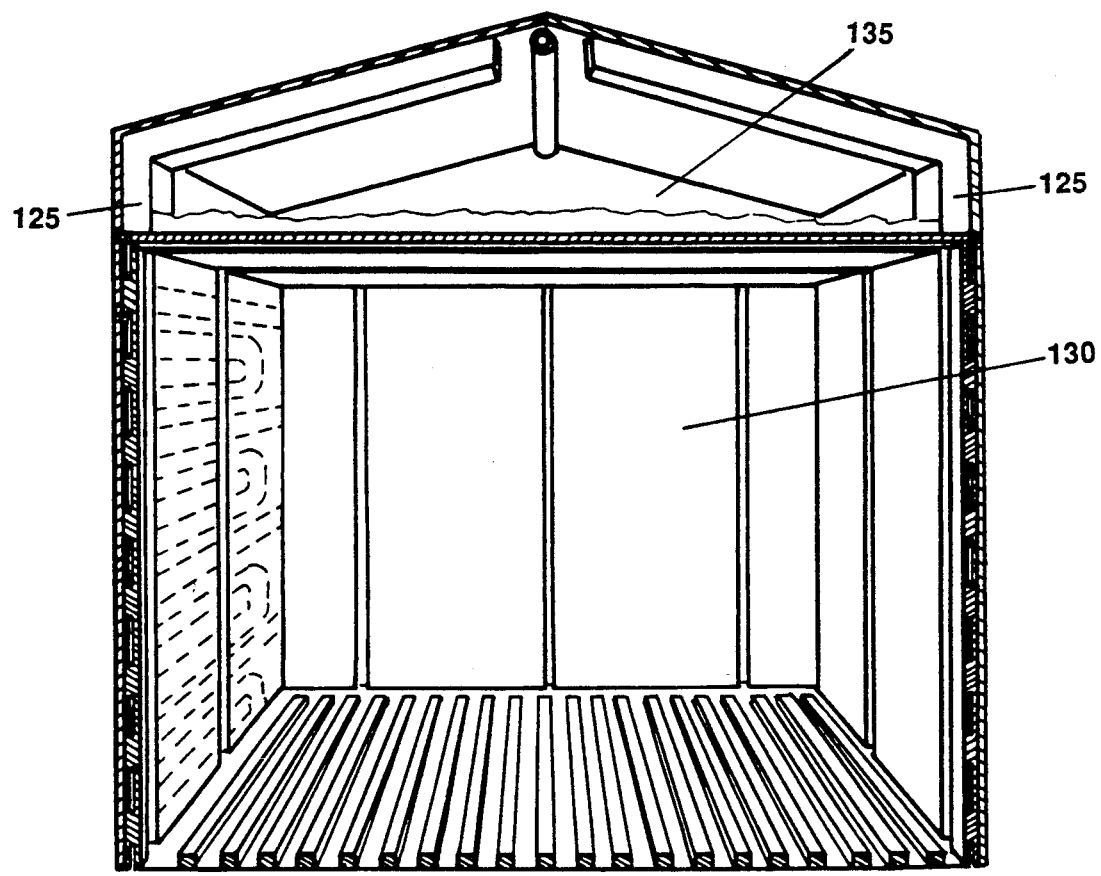
FIG. 8 is an end cross-sectional view of an additional alternative preferred embodiment in accordance with the present invention.

Yet another alternative embodiment is shown in FIG. 8, which is an embodiment designed specifically for transportation of fresh produce. The only substantive difference between this alternative embodiment and the first preferred embodiment is that the cooling vents 125 do not open to the lower compartment and, thus, no gas can pass from the upper compartment 135 to the lower compartment 130.

As can be seen from the above discussion, the present invention, as represented by these embodiments, has a number of advantages over existing carbon dioxide refrigeration systems. First, through the use of the switchable cooling vents, refrigeration containers utilizing the present invention may be used to refrigerate and transport either frozen materials or materials, such as fresh produce, which cannot be frozen or exposed to a high concentration carbon dioxide environment. This flexibility allows a single refrigeration container, such a railcar, truck trailer, or marine shipping container to be used in multiple roles.

The present invention, as represented by these and other embodiments, is also more effective than existing refrigeration systems. First, the carbon dioxide distribution system results in as efficient production of carbon dioxide "snow" as the prior art, producing one pound of "snow" for every two pounds of liquid carbon dioxide used. Further, the "snow" produced in the upper compartment of the present invention has a density of approximately 33 percent greater than the density of "snow" produced by existing systems. This allows an operator to obtain greater refrigeration without enlarging the area needed to store the carbon dioxide "snow".

The effectiveness of the present invention is also increased through the design of its exhaust means. By locating the vent box high on the endwall of the container, the pressure of the refrigerated gas is increased inside the container. This retards the sublimation of the carbon dioxide "snow" into gas and allows the container to remain sufficiently refrigerated for longer periods of time than is possible with existing systems.

The alternative embodiment of the exhaust means also features the same retardation of the sublimation of the carbon dioxide snow, while preventing water from entering the shipping container in marine environments and other environments where water may be a problem.

The design of the system to supply refrigerated air to the lower compartment also increases the reliability of the refrigeration system. By using a system in which refrigerated gas passes into the openings of cooling vent passages above the carbon dioxide distribution, and through those passages to the cooling vents located outside the upper compartment sidewalls, the cooling vents cannot be plugged by "snow" forming on the upper compartment floor.

Other variations and embodiments of the present invention are contemplated. Those skilled in the art will readily appreciate such variations upon carefully reviewing the above disclosure. Therefore, the present invention is not to be limited by the above description, but is to be determined in the scope of the claims which follow.

The following is hereby claimed:

1. An apparatus for refrigerating material within a container using carbon dioxide, which comprises:
   a container with a roof, two opposed sidewalls, first and second opposed endwalls, a floor, an upper compartment, and a lower compartment, said upper compartment and said lower compartment being separated by a substantially horizontal partition, said partition serving as a floor for said upper compartment and as a ceiling for said lower compartment, said upper compartment being further defined by said container sidewalls, said container roof, said container endwalls, and said lower compartment being further defined by said opposed container sidewalls, said opposed container endwalls, and said container floor;
   a means for creating carbon dioxide snow within said upper compartment comprising
   a longitudinal pipe extending from said first endwall substantially to said second endwall, said longitudinal pipe containing a plurality of apertures;
   a means of connecting said longitudinal pipe with a source of pressurized, liquid carbon dioxide; and
   an upper compartment exhaust vent means, said exhaust vent means allowing the passage of gas from said upper compartment only when said means for connecting a source of pressurized, liquid carbon dioxide is connected to said longitudinal pipe;
   a plurality of openings through said horizontal partition, said openings forming a plurality of cooling ducts, each said cooling duct allowing communication from said upper compartment to said lower compartment and each said cooling duct located in proximity to said container sidewalls;
   a plurality of ducts forming a plurality of cooling vent passages, one said passage attached to each said cooling vent, each said cooling vent passage having an upper opening located within said upper compartment in proximity to said container roof and a lower opening connected to said corresponding cooling vent with a sealed connection, so that gas from inside said upper compartment can enter said cooling vent passage through said upper opening and pass through said cooling passagevent to said corresponding cooling vent;
   a means for cooling said sidewalls of said lower compartment, so that said container may be used to refrigerate materials that cannot be frozen and are intolerant of high carbon dioxide environment or frozen items, comprising
   a plurality of raised surfaces located on said container sidewalls, said container endwalls, and said lower compartment ceiling in said lower compartment;
   two lower longitudinal ducts, one said lower longitudinal duct located within and at the bottom of each said sidewall and extending substantially from said first endwall to said second endwall;
   a plurality of serpentine passages, at least one said serpentine passage located within each said sidewall, said serpentine passage having a plurality of upper openings into said upper compartment, each said upper opening located under a portion of at least one said cooling vent, a plurality of substantially horizontal sections connected by a plurality of downwardly curving sections and an opening into said corresponding lower longitudinal duct, so that gas from said upper compartment can pass through said cooling vents, and enter said lower compartment, or enter said serpentine passages, pass repeatedly behind each said sidewall, and enter said lower longitudinal ducts without entering said lower compartment, or enter both said lower compartment and said serpentine passages simultaneously, and a plurality of switchable valve means, one said valve means attached to each said cooling vent, each said valve means having a closed position which prevents the passage of gas into said lower compartment.

2. The apparatus for refrigerating materials as claimed in claim 1, wherein the means of exhausting gas from said container further comprises:
   a vent box containing a plurality of flap valves in series, so that gas escaping from inside the container will have to pass through all said valves, said vent box located outside said container on said second endwall at a height approximately three-quarters of the height of said lower compartment;
   a vent box passage, located within said second endwall and connecting both lower longitudinal ducts with said vent box, so that gas passing through said serpentine passages to said lower longitudinal ducts may travel to said vent box without entering said lower compartment;
   a lower exhaust vent located within said lower compartment on said second endwall in proximity to said container floor, said lower exhaust vent opening from said lower compartment into said vent box passage, so that gas in said lower compartment can pass from said lower compartment to said vent box; and
   a subflooring means on said container floor defining a plurality of floor ducts, said floor ducts extending substantially from said first endwall to said second endwall, and said floor ducts being open to gas in said lower container, so that gas in said lower compartment can pass through said floor ducts to said lower exhaust vent.

3. The apparatus for refrigerating materials as claimed in claim 2, wherein said apparatus further comprises:

at least one circulation duct, said circulation duct located within said horizontal partition and extending substantially the length of said partition from said first endwall to said second endwall;

a plurality of apertures opening from each said circulation duct downwardly into said lower compartment; and at least one circulation means, one said circulation means attached to each said circulation duct, so that gas can be circulated within said lower compartment.

4. The apparatus for refrigerating materials as claimed in claim 1, wherein the means of exhausting gas from said container further comprises:

at least one lower external exhaust vent located outside said container on said second endwall at approximately the same height as said container floor;

an exhaust vent passage, located within said second endwall and connecting both lower longitudinal ducts with said lower external exhaust vents, so that gas passing through said serpentine passages to said lower longitudinal ducts may travel to at least one said lower external exhaust vent without entering said lower compartment;

at least one lower internal exhaust vent located within said lower compartment on said second endwall in proximity to said container floor, each said lower internal exhaust vent opening from said lower compartment into said exhaust vent passage, so that gas in said lower compartment can pass from said lower compartment through said exhaust vent passage to said lower external exhaust vent;

at least one vertical barrier means, one said barrier means located between each said lower external exhaust vent and each said lower internal exhaust vent, and one said barrier means between each said lower external exhaust vent and each said lower longitudinal duct, one said barrier means being sufficient when said lower longitudinal duct and said lower internal exhaust means are in proximity to each other, and one said barrier means can be between said lower external exhaust vent, and said lower longitudinal duct and said lower internal exhaust vent; and a subflooring means on said container floor defining a plurality of floor ducts, said floor ducts extending substantially from said first endwall to said second endwall, and said floor ducts being open to gas in said lower container, so that gas in said lower compartment can pass through said floor ducts to at least one said lower internal exhaust vent.

5. The apparatus for refrigerating materials as claimed in claim 4, wherein said apparatus further comprises:

at least one circulation duct, said circulation duct located within said horizontal partition and extending substantially the length of said partition from said first endwall to said second endwall;

a plurality of apertures opening from each said circulation duct downwardly into said lower compartment; and at least one circulation means, one said circulation means attached to each said circulation duct, so that gas can be circulated within said lower compartment.

6. An apparatus for refrigerating materials within a container using carbon dioxide which comprises:

a container with a roof, two opposed sidewalls, first and second opposed endwalls, a floor, an upper compartment, and a lower compartment, said upper compartment and said lower compartment being separated by a substantially horizontal partition, said partition serving as a floor for said upper compartment and as a ceiling for said lower compartment, said upper compartment being further defined by said container sidewalls, said container roof, said container endwalls, and said lower compartment being further defined by said opposed container sidewalls, said opposed container endwalls, and said container floor;

a plurality of openings through said horizontal partition, said openings forming a plurality of cooling ducts, each said cooling duct allowing communication from said upper compartment to said lower compartment and each said cooling duct located in proximity to said container sidewalls;

a plurality of ducts forming a plurality of cooling vent passages, one said passage attached to each said cooling vent, each said cooling vent passage having an upper opening located within said upper compartment in proximity to said container roof and a lower opening connected to said corresponding cooling vent with a sealed connection, so that gas from inside said upper compartment can enter said cooling vent passage through said upper opening and pass through said cooling vent passage to said corresponding cooling vent;

a longitudinal pipe extending from said first endwall substantially to said second endwall, said longitudinal pipe containing a plurality of apertures;

a means of connecting said longitudinal pipe with a source of pressurized, liquid carbon dioxide;

an upper compartment exhaust vent means, said exhaust vent means allowing the passage of gas from said upper compartment only when said means for connecting a source of pressurized, liquid carbon dioxide is connected to said longitudinal pipe;

a plurality of raised surfaces located on said container sidewalls, said container endwalls, and said lower compartment ceiling in said lower compartment;

two lower longitudinal ducts, one said lower longitudinal duct located within and at the bottom of each said sidewall and extending substantially from said first endwall to said second endwall;

a plurality of serpentine passages, at least one said serpentine passage located within each said sidewall, said serpentine passage having a plurality of upper openings into said upper compartment, each said upper opening located under a portion of at least one said cooling vent, a plurality of substantially horizontal sections connected by a plurality of downwardly curving sections and an opening into said corresponding lower longitudinal duct, so that gas from said upper compartment can pass through said cooling vents, and enter said lower compartment, or enter said serpentine passages, pass repeatedly behind each said sidewall, and enter said lower longitudinal ducts without entering said lower compartment, or enter both said lower compartment and said serpentine passages simultaneously;

a plurality of switchable valve means, one said valve means attached to each said cooling vent, each said valve means having a closed position which prevents the passage of gas into said lower compartment;

at least one lower external exhaust vent located outside said container on said second endwall at approximately the same height as said container floor;

an exhaust vent passage, located within said second endwall and connecting both lower longitudinal ducts with said lower external exhaust vents, so that gas passing through said serpentine passages to said lower longitudinal ducts may travel to at least one said lower external exhaust vent without entering said lower compartment;

at least one lower internal exhaust vent located within said lower compartment on said second endwall in proximity to said container floor, each said lower internal exhaust vent opening from said lower compartment into said exhaust vent passage, so that gas in said lower compartment can pass from said lower compartment through said exhaust vent passage to said lower external exhaust vent;

at least one vertical barrier means, one said barrier means located between each said lower external exhaust vent and each said lower internal exhaust vent, and one said barrier means between each said lower external exhaust vent and each said lower longitudinal duct, one said barrier means being sufficient when said lower longitudinal duct and said lower internal exhaust means are in proximity to each other and one said barrier means can be between said lower external exhaust vent, and said lower longitudinal duct and said lower internal exhaust vent; and a subflooring means on said container floor defining a plurality of floor ducts, said floor ducts extending substantially from said first endwall to said second endwall, and said floor ducts being open to gas in said lower container, so that gas in said lower compartment can pass through said floor ducts to at least one said lower internal exhaust vent.

7. The apparatus for refrigerating materials as claimed in claim 6, wherein said apparatus further comprises:
at least one circulation duct, said circulation duct located within said horizontal partition and extending substantially the length of said partition from said first endwall to said second endwall;
a plurality of apertures opening from each said circulation duct downwardly into said lower compartment; and
at least one circulation means, one said circulation means attached to each said circulation duct, so that gas can be circulated within said lower compartment.

8. The apparatus for refrigerating materials as claimed in claim 6, wherein said container is a railcar.

9. The apparatus for refrigerating materials as claimed in claim 7, wherein said container is a railcar.

10. The apparatus for refrigerating materials as claimed in claim 6, wherein said container is a shipping container for use on a cargo ship.

11. The apparatus for refrigerating materials as claimed in claim 7, wherein said container is a shipping container for use on a cargo ship.

12. An apparatus for refrigerating material within a container using carbon dioxide which comprises:
a container with a roof, two opposed sidewalls, first and second opposed endwalls, a floor, an upper compartment, and a lower compartment, said upper compartment and said lower compartment being separated by a substantially horizontal partition, said partition serving as a floor for said upper compartment and as a ceiling for said lower compartment, said upper compartment being further defined by said container sidewalls, said container roof, said container endwalls, and said lower compartment being further defined by said opposed container sidewalls, said opposed container endwalls, and said container floor;

a means for creating carbon dioxide snow within said upper compartment including
a longitudinal distribution pipe extending from said first endwall substantially to said second endwall, said longitudinal distribution pipe containing a plurality of apertures;
a means of connecting said longitudinal distribution pipe with a source of pressurized, liquid carbon dioxide; and
an upper compartment exhaust vent means, said exhaust vent means allowing the passage of gas from said upper compartment only when said means for connecting a source of pressurized, liquid carbon dioxide is connected to said longitudinal distribution pipe;

a plurality of openings through said horizontal partition, said openings forming a plurality of cooling vents, each said cooling vent located in proximity to said container sidewalls;

a plurality of ducts forming a plurality of cooling vent passages, one said passage attached to each said cooling vent, each said cooling vent passage having an upper opening located within said upper compartment in proximity to said container roof and a lower opening connected to said corresponding cooling vent with a sealed connection, so that gas from inside said upper compartment can enter said cooling vent passage through said upper opening and pass through said cooling vent passage to said corresponding cooling vent;

a means for cooling said sidewalls of said lower compartment so that said container may be used to refrigerate materials that cannot be frozen and are intolerant of high carbon dioxide environment, including
a plurality of raised surfaces located on said container sidewalls, said container endwalls, and said lower compartment ceiling in said lower compartment;
two lower longitudinal ducts, one said lower longitudinal duct located within and at the bottom of each said sidewall and extending substantially from said first endwall to said second endwall;
a plurality of serpentine passages, at least one said serpentine passage located within each said sidewall, said serpentine passage having a plurality of upper openings into said upper compartment, each said upper opening located substantially under at least one said cooling vent, a plurality of substantially horizontal sections connected by a plurality of downwardly curving sections and an opening into said corresponding lower longitudinal duct, so that gas from said upper compartment can pass through said cooling vents into serpentine passages, pass repeatedly behind each said sidewall, and enter said lower longitudinal ducts without entering said lower compartment;

means of exhausting gas from said container, including at least one lower external exhaust vent located outside said container on said second endwall at approximately the same height as said container floor;

an exhaust vent passage, located within said second endwall and connecting both lower longitudinal ducts with said lower external exhaust vents, so that gas passing through said serpentine passages to said lower longitudinal ducts may travel to at least one said lower external exhaust vent without entering said lower compartment;

at least one lower internal exhaust vent located within said lower compartment on said second endwall in proximity to said container floor, said lower internal exhaust vent opening from said lower compartment into said exhaust vent passage, so that gas in said lower compartment can pass from said lower compartment to said lower external exhaust vent;

at least one vertical barrier means, one said barrier means located between each of said lower external exhaust vent and each said lower internal exhaust vent, and one said barrier means between each said lower external exhaust vent and each said lower longitudinal duct, one said barrier means being effective when said lower longitudinal duct and said lower internal exhaust means are in proximity to each other; and a subflooring means on said container floor defining a plurality of floor ducts, said floor ducts extending substantially from said first endwall to said second endwall, and said floor ducts being open to gas in said lower container, so that gas in said lower compartment can pass through said floor ducts to at least one said lower internal exhaust vent.

13. The apparatus for refrigerating materials as claimed in claim 12, wherein said apparatus further comprises:

at least one circulation duct, said circulation duct located within said horizontal partition and extending substantially the length of said partition from said first endwall to said second endwall;

a plurality of apertures opening from each said circulation duct downwardly into said lower compartment; and at least one circulation means, one said circulation means attached to each said circulation duct, so that gas can be circulated within said lower compartment.

* * * * *